Sept. 13, 1927.   J. W. WOOD ET AL   1,642,570
ELECTRICALLY HEATED WINDSHIELD WIPER
Filed May 5, 1927
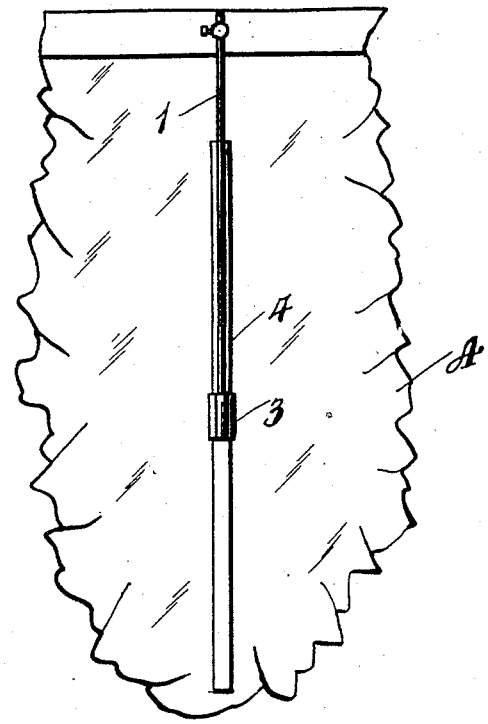
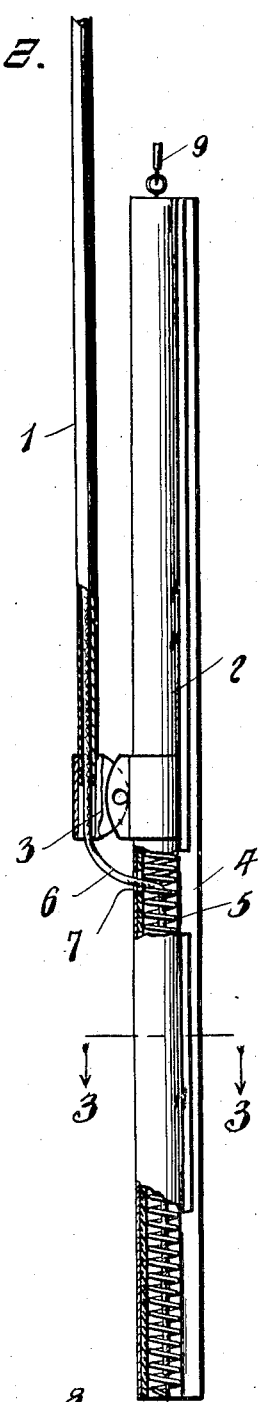
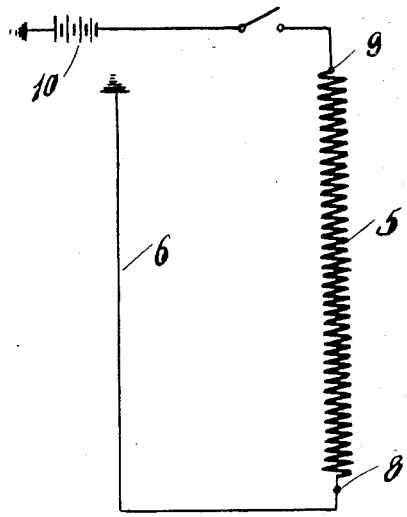
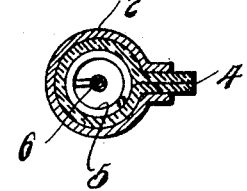
Inventor
J. W. Wood & O. C. Giauque.
Attorney Patented Sept. 13, 1927.

1,642,570

UNITED STATES PATENT OFFICE.

JUSTICE W. WOOD AND OSCAR C. GIAUQUE, OF HILLSDALE, MICHIGAN.

ELECTRICALLY-HEATED WINDSHIELD WIPER.

Application filed May 5, 1927. Serial No. 189,024.

The invention relates to wipers for windshields and has for its object the provision of a resistance element supplied from a source of electric energy to heat the wiper to make it effective in removing ice and snow from windshields.

A further object of the invention is the provision of a windshield wiper comprising a tubular clamping member containing a strip of wiping material having opposite edges extending from a longitudinal slit of the shell of the member and enclosing a coil of wire forming with the strip of wiping material a resistance element, said coil of wire terminally in circuit with a source of electric energy such for instance as the storage battery carried by the automobile.

The invention will be described in detail hereinafter and will be found illustrated in the accompanying drawings in which Figure 1 is a front view of a fragment of the windshield showing the improved wiper in position thereon, Figure 2 is a side view of the wiper shown partly in section, Figure 3 is a transverse sectional view, and Figure 4 is a diagrammatic view of the electric circuit.

In the drawings similar reference characters will be used to designate corresponding parts throughout the several views.

In the drawings, Figure 1 the improved wiper is shown applied to a windshield A and has a tubular arm 1 pivotally mounted on the frame of the windshield and operated in the usual manner. A tubular clamping member 2 is secured to the free end of the arm 1 as shown at 3 and encloses a strip of wiping material 4 having its opposite edges projecting from the clamping member 2 to form a wiping surface. The strip of material 4 is folded within the clamping member and encloses a coil of resistance wire 5, having one of its ends connected with a wire 6 extending through the tubular arm A and into the clamping member 2 through an opening 7 and then extended between the folded strip of wiping material 4 and the shell of the clamping member and secured to one end of the resistance coil 5 as shown at 8. The other end of the coil is connected by means of a wire 9 with a source of electric energy or may be grounded on a vehicle where a grounded circuit is used, the source of energy being a storage battery carried by the automobile and designated 10. A suitable switch to control the circuit to the windshield wiper may be employed, such a switch being diagrammatically shown at 11 in Figure 4.

What is claimed is:—

A windshield wiper, comprising a tubular clamping member having an opening extending lengthwise thereof, wiping material enclosed within said member and having edges extending through the opening therein, and an electric resistance element enclosed within said wiping material and in circuit with a source of electricity.

In testimony whereof we affix our signatures.

JUSTICE W. WOOD.
OSCAR C. GIAUQUE.